United States Patent [19]

Takao

[11] 3,944,236

[45] Mar. 16, 1976

[54] PISTON RING

[75] Inventor: Tsutomu Takao, Tokyo, Japan

[73] Assignee: Nippon Piston Ring Co., Ltd., Tokyo, Japan

[22] Filed: June 27, 1975

[21] Appl. No.: 590,997

[30] Foreign Application Priority Data
July 5, 1974 Japan............................ 49-76433

[52] U.S. Cl. ............................................ 277/224
[51] Int. Cl.² .......................................... F16J 9/20
[58] Field of Search ......... 277/224, 225, 235, 236, 277/237

[56] References Cited
UNITED STATES PATENTS
894,880  8/1908  Garlock ............................ 277/224
2,956,848  10/1960  St. Clair ............................ 277/224
3,669,461  6/1972  Togami ............................ 277/224

Primary Examiner—Robert I. Smith
Attorney, Agent, or Firm—Sughrue, Rothwell, Mion, Zinn & Macpeak

[57] ABSTRACT

A piston ring whose piston ring sliding surface is provided with a channel having chrome plating layer, with grooves continuously or discontinuously provided on the borders of the chrome layer and land portions of the piston ring sliding surface so that the ridgelines of the chrome layer form an obtuse angle at each side thereof.

3 Claims, 4 Drawing Figures

PISTON RING

BACKGROUND OF THE INVENTION

1. Field of the Invention

This invention relates to a piston ring for internal combustion engines, and more particularly to a piston ring whose piston ring sliding surface is provided with a channel having a chrome plating layer (hereinafter referred merely to as a "chrome insert piston ring").

2. Description of the Prior Art

Conventionally, a chrome insert piston ring which is provided in its sliding surface with a cast iron base body 1' and a chrome layer 4 as illustrated in FIG. 1 of the drawings has been used in order to improve its early fit during the breakingin period after the piston ring has been incorporated and also to improve its wear resistance during normal or steady operation.

The prior art chrome insert piston ring of this type, however, does not have sufficient scuffing resistance. That is, since the hardness of the chrome layer 4 and that of the cast iron base body 1' of the piston ring sliding surface are different during operation a small difference ($\alpha$) in level will appear therebetween as illustrated in FIG. 2 so as to form projecting sharp edges 4' and 4" which will come into contact with the mating cylinder wall, resulting in scuffing occurring, particularly when lubrication is poor. Also, oil-up tends to occur with the prior art chrome insert piston ring since the upper edge of the upper land 1' and the lower edge of the lower land 1' of the piston ring usually both must be bevelled to a large degree in order to prevent scuffing as much as possible. If the beveling is small, scuffing would readily occur. In addition, recently engines have been designed to have higher power, pressure level and speed, and thus the piston ring for these engines naturally must have a sliding surface with higher wear resistance and with higher scuffing resistance in accordance with the tendency.

SUMMARY OF THE INVENTION

Therefore, an object of this invention is to provide a chrome insert piston ring for use in a high power, high pressure level, and high speed internal combustion engine.

Another object of this invention is to provide a chrome insert piston ring for an internal combustion engine which has superior scuffing resistance and oil scraping performance as well as superior breaking-in characteristics and high wear resistance.

Still another object of this invention is to provide a chrome insert piston ring for an internal combustion engine in which the above-mentioned disadvantages of the prior art have been eliminated.

Accordingly, this invention provides a chrome insert piston ring whose piston ring sliding surface has a channel provided with a chrome plating layer, the piston ring comprising the chrome layer with grooves continuously or discontinuously provided on the borders of the chrome layer and land portions of the piston ring sliding surface so that the chrome layer has ridgelines forming at an obtuse angle at each side thereof.

BRIEF DESCRIPTION OF THE DRAWING

Other features and advantages of the invention will be apparent from the following description taken in connection with the accompanying drawing in which.

DESCRIPTION OF THE PREFERRED EMBODIMENTS

Figure 1:
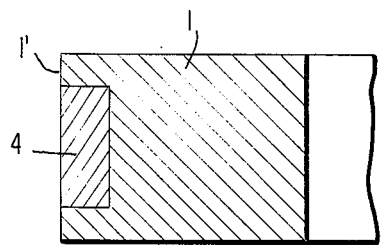
FIG. 1 shows a cross-sectional view of the prior art chrome insert piston ring.
Figure 2:
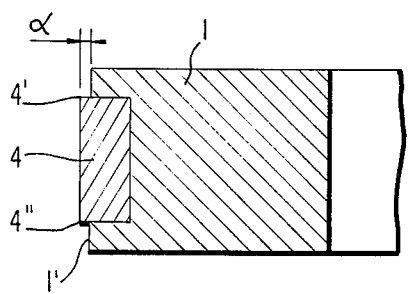
FIG. 2 shows a cross-sectional view of the prior art chrome insert piston ring for explaining the level difference generated in operation.
Figure 3:
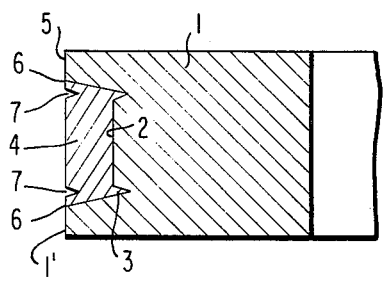
FIG. 3 shows a cross-sectional view of a chrome insert piston ring according to this invention.

As shown in FIG. 3, the chrome insert piston ring according to this invention, which is indicated by the numeral 1, includes a chrome plating layer 4 in a channel 2 provided in the sliding surface 5 of the piston ring 1. On the chrome layer 4 first upper and lower grooves 7 at the borders 6 of the chrome layer 4 and land portion 1' of the piston ring sliding surfaces 5 are formed in such a way that the chrome layer 4 has its ridgelines at an obtuse angle on each side thereof. The formation of the first grooves 7 can be automatically accomplished in plating the chrome by previously providing second grooves 3 deeper than the channel 2 in the piston ring base body. The first upper goove and/or the lower groove can be formed continuously or discontinuously.

In operation, the piston ring according to this invention can effectively prevent scuffing. First, the chrome layer 4 of this invention is constructed so that the ridgelines of the layer are formed at an obtuse angle, and therefore, the piston ring sliding surface 5 can slide smoothly with respect to the cylinder wall without the production of the sharp edges 4' and 4" even if a level difference appears during operation between the chrome layer 4 and the land portion 1' of the piston ring sliding surface 5. Secondly, each of the first grooves of the piston ring of this invention functions in operation as a lubricating oil retaining portion, from which the lubricating oil is supplied to the outer surface 5 throughout the sliding movement of the piston ring 1 so as to provide good wettability thereon. Also, the lubricating oil is supplied between the outer surface of the chrome layer 4 and the cylinder wall to form a lubricating oil membrane therebetween thereby preventing the piston ring from coming into metal-to-metal contact with the cylinder wall. Moreover, the lubricating oil retained in the first grooves 7 is supplied in operation between the land portion 1' of the level difference portion and the cylinder wall to form a lubricating oil membrane therebetween so as to provide good wettability, thereby preventing the generation of scuffing even if the beveling of the upper edge of the upper land portion 1' and the lower edge of the lower land portion 1' is small in order to maintain effective oil scraping. It has been confirmed experimentally that if the beveling is almost zero, scuffing would not occur. As described above, the chrome insert piston ring according to this invention has a remarkably superior scuffing resistance and oil scraping effect as well as a good breaking-in characteristics and high wear resistance, and this chrome insert piston ring is free from the disadvantages of the prior art chrome insert piston ring.

Figure 4:
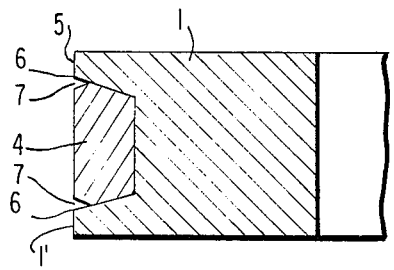
FIG. 4 shows a cross-sectional view of a chrome insert piston ring according to another embodiment of this invention.

FIG. 4 illustrates a chrome insert piston ring according to another embodiment of this invention in which the first grooves 7 are formed at the borders 6 of the land portion 1' and the chrome layer 4 of the piston ring sliding surface 5. The formation of the first grooves can be mechanically accomplished by tooling.

With respect to the first grooves 7 of the piston ring of this invention, the width, angle of the ridgelines, and depth thereof can be selected appropriately in accordance with the dimension of the piston ring and the condition of the engine in which the piston ring is incorporated. Further, the shape of the first groove 7 is preferably a V-shape, but shapes other than a V-shape can be used as long as the ridgeline of the chrome layer 4 is formed at an obtuse angle.

While the invention has been described in detail and with reference to specific embodiments thereof, it will be apparent to one skilled in the art that various changes and modifications can be made therein without departing from the spirit and scope thereof.

What is claimed is:

1. In a piston ring whose piston ring sliding surface is provided with a channel having a chrome plating layer therein, the improvement comprising, the piston ring with said chrome layer having an upper groove and lower groove at the borders of said chrome layer and, the land portions of said piston ring sliding surface and the ridgelines of said chrome layer forming an obtuse angle at each side thereof.

2. The chrome insert piston ring as set forth in claim 1, wherein at least one of said upper groove, and said lower groove is continuously or discontinuously formed.

3. The chrome insert piston ring as set forth in claim 1, wherein said grooves have a V-shaped configuration.

* * * * *